(12) United States Patent
Shen et al.

(10) Patent No.: US 6,810,082 B1
(45) Date of Patent: Oct. 26, 2004

(54) CHROMA BASED ADAPTIVE SIGNAL PEAKING

(75) Inventors: Richard Shen, Leonia, NJ (US); Alan Cavallerano, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 405 days.

(21) Appl. No.: 09/613,230

(22) Filed: Jul. 10, 2000

Related U.S. Application Data

(63) Continuation-in-part of application No. 09/466,403, filed on Dec. 17, 1999, now abandoned.

(51) Int. Cl.[7] ................................................. H04N 7/12
(52) U.S. Cl. ................................................. 375/240.2
(58) Field of Search .................... 375/240.08, 240.2, 375/240.29; 348/396.1, 390.1; 382/232, 250; H04N 7/12, 5/208

(56) References Cited

U.S. PATENT DOCUMENTS

| | | | |
|---|---|---|---|
| 4,466,016 A | | 8/1984 | Pritchard ..................... 358/31 |
| 4,597,011 A | | 6/1986 | Baker ........................ 358/166 |
| 4,635,119 A | | 1/1987 | Baker ........................ 358/155 |
| 5,012,329 A | | 4/1991 | Lang et al. .................. 358/31 |
| 5,124,794 A | | 6/1992 | Rabii ........................ 358/166 |
| 5,161,015 A | | 11/1992 | Citta et al. ................. 358/162 |
| 5,231,484 A | * | 7/1993 | Gonzales et al. ....... 375/240.04 |
| 5,416,532 A | | 5/1995 | Ko ............................ 348/665 |
| 5,768,534 A | * | 6/1998 | Guillotel et al. ............ 709/247 |
| 5,930,398 A | * | 7/1999 | Watney ...................... 382/239 |
| 6,026,190 A | * | 2/2000 | Astle ......................... 382/232 |
| 6,101,278 A | * | 8/2000 | Chen et al. ................. 382/239 |
| 6,473,533 B1 | * | 10/2002 | Yokose et al. .............. 382/248 |

FOREIGN PATENT DOCUMENTS

| | | |
|---|---|---|
| DE | 4319834 C2 | 12/1994 |
| WO | 8911196 A1 | 11/1989 |
| WO | 9613780 A2 | 5/1996 |
| WO | PCT/EP00/12731 * | 4/2001 .......... H04N/5/028 |

OTHER PUBLICATIONS

"Handbook of Digital Signal Processing Engineering Applications", pp. 238–252.
"Digital Television Fundamentals", chapter 8, pp. 354–365.
"Discrete Cosine Transform", pp. 237–254.

* cited by examiner

Primary Examiner—Nhon Diep
(74) Attorney, Agent, or Firm—Laurie E. Gathman

(57) ABSTRACT

A method and apparatus for the selective peaking of portions of a video signal is provided. The video signals, such as those transmitted in compressed form, in accordance with MPEG Standards, can be presented as blocks of data encoded using Discrete Cosine Transforms (DCT). The Discrete Cosine Transform coefficients corresponding to the chrominance values of the signal can be obtained and analyzed. The analysis and corresponding amounts of enhancement (peaking) can be performed on a block-by-block, I-frame by I-frame, basis to selectively peak portions of a video signal. If the DCT coefficients for a portion of the signal exceed or fall within a pre-selected value or range, that portion of the signal can be subjected to peaking. For example, if the high frequency horizontal DCT coefficients exceed (or fall within) a pre-set threshold value or range, a horizontal peaking circuit can be set to peak that portion of the signal. The signal processor can be set for gain in proportion to how much the coefficients exceed the threshold. A similar approach can be applied in the vertical spatial direction.

25 Claims, 21 Drawing Sheets

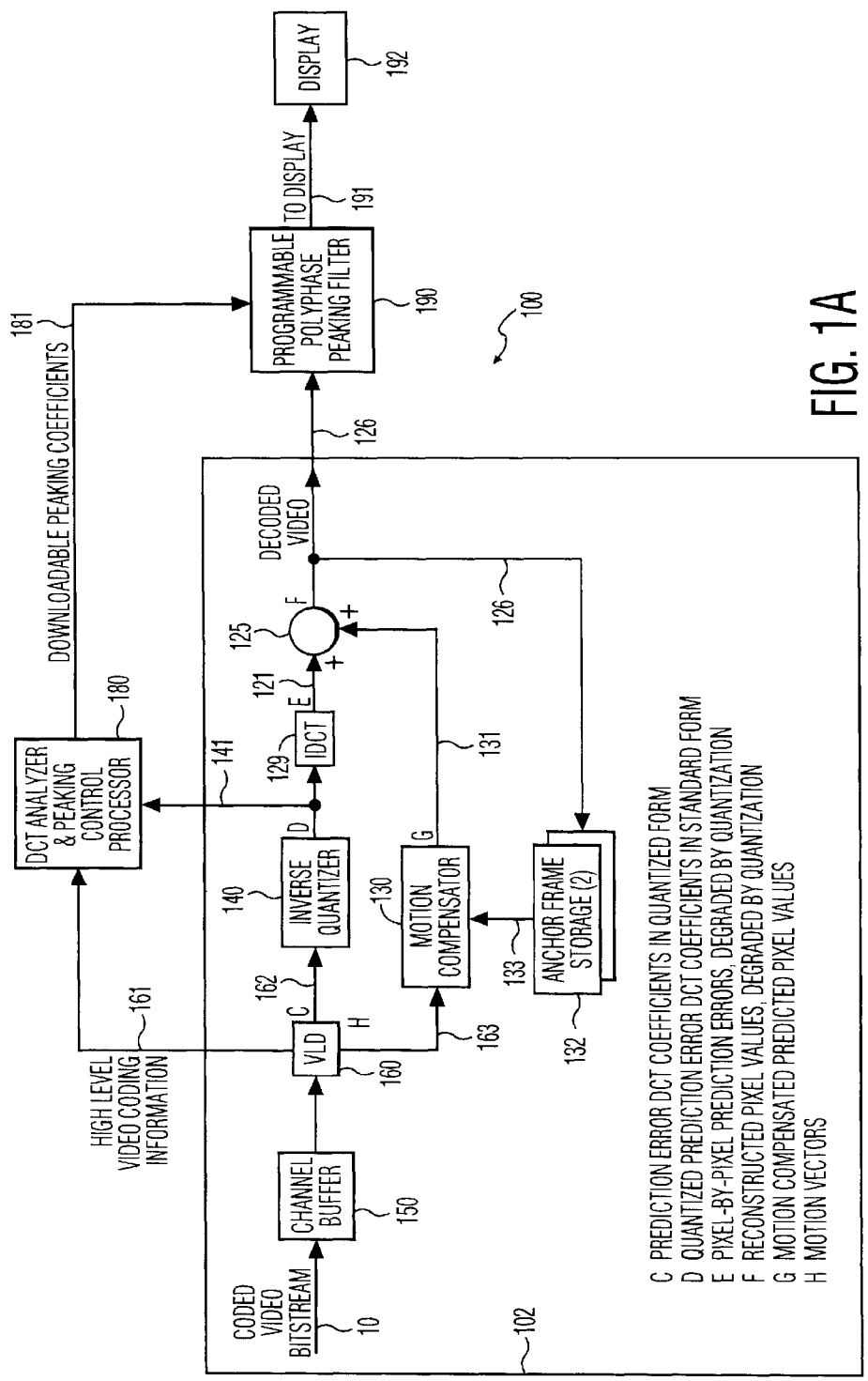

CHROMINANCE Pb
WITH NOISE
AND NO EDGES
NO SHARP TRANSITIONS

CHROMINANCE Pr
WITH NOISE
AND NO EDGES

CHROMA BASED ADAPTIVE SIGNAL PEAKING

CROSS REFERENCE TO RELATED APPLICATION

This application is a continuation-in-part of application Ser. No. 09/466,403, filed Dec. 17, 1999, now abandoned the contents of which are incorporated herein by reference.

BACKGROUND OF THE INVENTION

This invention relates generally to video signal processing and more particularly to improved methods of peaking signals, especially coded digital video signals.

Peaking (signal enhancement) is commonly applied to an output video signal before the signal is displayed, in order to enhance high frequency edges to enhance the sharpness of a displayed image. A conventional video signal is generally comprised of luminance and color components. A luminance signal (or component of a signal) is frequently designated a Y signal or signal component and a chrominance signal (or component of a signal) is frequently designated a P signal or signal component. Video signals generally contain vertical, horizontal, diagonal and temporal details. Although it is possible to apply peaking in any of these directions (e.g. vertical or horizontal), such signal enhancement is typically only performed in the horizontal direction.

Conventional peaking systems commonly employ a filter, such as a high pass filter, to select the high frequency portions of a signal. Typical television sharpness controls apply a horizontal filter to the luminance signal. The output of the high pass filter is then added to the source video signal. If the source video signal contains high frequency components, these components will be output from the high pass filter and may be adjusted in amplitude based on the amount of peaking desired, and when added back to the source video signal, the high frequency components of the source video signal will be boosted (increased) in amplitude. The net effect is to "peak" or "sharpen" the image by increasing the slope of the signal corresponding to edges of the displayed image. Thus, the displayed image, after peaking, will look sharper or crisper. The inverse may also be applied to decrease the high frequency components and actually "soften" the image.

Image signals are commonly encoded digitally for transmission and then decoded for display. For example, the Motion Pictures Experts Group is an ISO group that sets standards (MPEG standards) for compressing and storing video, audio and animation in digital form. MPEG-1 is a standard audio and video coding format for low density storage media such as CD-ROMs video CDs and so forth. MPEG-2 is a standard coding format for broadcast video. In MPEG, the compression method involves I-frames or intra frames. A frame refers to a complete TV picture. It can be made up of multiple fields, such as a field of odd numbered lines and a field of even-numbered lines. An I-frame is an intra-coded video frame that is independent of other video frames in MPEG standard. I-frame is repeated at a regular interval to refresh the coding sequence. Between any two I-frames are P-frames (Predictive frames) and B-frames (Bi-directional predictive frames). The P- and B-frames only contain information or changes between the I-frames. An I-frame and its P- and B-frames are called a GOP (Group of Pictures).

MPEG compression methods are lossy compression methods. When color images are coded, decoded, and subjected to digital post processing, the display can develop undeliverable characteristics. For example, when a portion of an image has saturated colors, that portion of the image can experience significant enhancement of noise when conventional filters are applied to peak the image. This can be particularly true of blue sections of an image, to which the eye is most sensitive. Thus, while sharpening edges, conventional peaking systems and/or filters can add objectionable noise to regions intended to lack color details.

Video signals typically involve some type of noise component. The noise can be present in the actual video signal. Noise can also be introduced by processing circuitry, such as at the encoder, decoder, transmitter, analog-digital converter (ADC), digital-analog converter (DAC) and so forth. Because the frequency of the noise will often pass through the high pass filter, the noise envelope of the signal can become amplified by a conventional peaking filter. A portion of a video signal might be intended to be flat (i.e., containing no details). Increasing the noise envelope in such a portion of a signal can be particularly subjectively noticeable and troublesome when it occurs in a portion of a video signal intended to display a uniform monochrome area.

Various methods have been proposed for improving conventional video peaking systems. For example, U.S. Pat. No. 4,466,016 discloses television signal filtering systems and systems for separating television luminance and chrominance signals for subsequent video information processing. U.S. Pat. No. 5,416,532 describes adaptive video peaking circuitry and systems for use with a luminance/chrominance separator. The reference describes circuits and systems for analyzing nine pixel arrays, applying various filters and constructively combining horizontal and vertical peaking signals. Various other peaking and noise coring proposals are disclosed in U.S. Pat. No. 5,124,794, U.S. Pat. No. 5,161,015, U.S. Pat. Nos. 4,597,011, 4,635,119, 5,012,329 and WO 89/11196. The contents of all of these are incorporated herein by reference. These proposals are not believed to be fully satisfactory, as for example, being only applicable to analog rather than digital signals, not being satisfactory or applicable to signals in accordance with MPEG or ATSC standards or unsatisfactorily increasing noise in undesirable locations of an image.

Accordingly, it is desirable to provide improved methods and systems for peaking a video signal and overcoming drawbacks of the prior art.

SUMMARY OF THE INVENTION

Generally speaking, in accordance with the invention, a method and apparatus for the selective peaking of portions of a video signal is provided. The video signals, such as those transmitted in compressed form in accordance with MPEG Standards, can be presented as blocks of data encoded using Discrete Cosine Transforms (DCT). The Discrete Cosine Transform coefficients of a signal can be readily obtained and analyzed. If the analysis of the DCT coefficients detects appropriate energy levels, such as those characteristic of edge portions of an image or other details in a portion of an image, that portion of the signal can be peaked. Portions of a signal corresponding to flat images can be minimally peaked, or not peaked at all. The analysis of the signal and corresponding amounts of enhancement (peaking), if any, can be performed on a block-by-block basis to selectively peak portions of a video signal. Thus, if the DCT coefficients for a portion of the signal exceed or fall within a pre-selected value or range, that portion of the signal can be subjected to peaking. For example, if the amplitude of the high frequency horizontal frequency DCT coefficients exceed (or fall within) a pre-set threshold value or range, a horizontal peaking circuit can be set to peak that portion of the signal. Peaking can also be performed in the vertical direction or both horizontally and vertically. The signal processor controlling such peaking can be set for gain in proportion to how much the DCT coefficients exceed the threshold.

An analog signal can be sent in parallel to an analog-to-digital converter and then to a processor which obtains the DCT coefficients of the converted signal. These coefficients can be analyzed and used to control the adaptive peaking filter coefficients for the spatial block corresponding to the given DCT block for the corresponding portion of the analog signal. The analog signal can also be converted to a digital signal, peaked in accordance with the invention and converted back to an analog signal.

In a preferred embodiment of the invention, the peaking of the luminance, chrominance or both portions of the signal can be selectively controlled based on the spectral histogram of the chrominance energy and/or chrominance difference signals present in the image signal. Such chrominance energy can be ascertained by analyzing the DCT coefficients of an MPEG encoded signal.

Accordingly, it is desirable to provide an improved system and method for peaking a video signal and an improved peaked signal resulting from such system and the display of such signal.

Another object of the invention is to provide an improved peaked signal resulting from such system and the display of such signal.

Another object of the invention is to provide an improved system and method for peaking a compressed digital video signal.

Yet another object of the invention is to provide an improved signal processor for peaking a video signal.

The invention accordingly comprises the several steps and the relation of one or more of such steps with respect to each of the others, and the product and signal adapted to effect or resulting from such steps, all as exemplified in the following detailed description and drawings and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 1A, is a block diagram of a video receiver, including an adaptive peaking system in accordance with a preferred embodiment of the invention;

DETAILED DESCRIPTION OF THE PREFERRED EMBODIMENTS

Figure 1B:
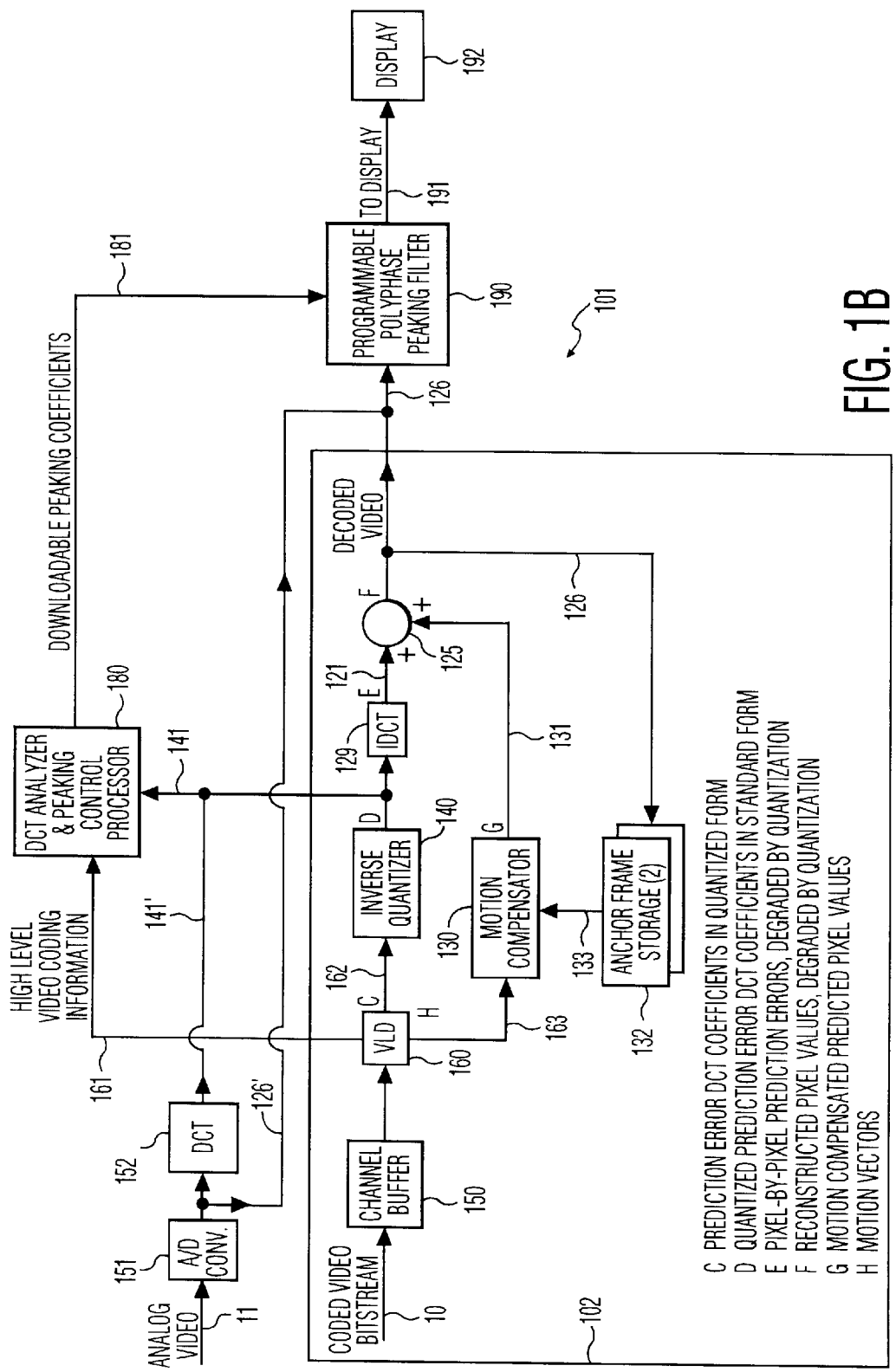
FIG. 1B is a block diagram of the video receiver of FIG. 1A, with added features for processing an analog signal.

Adaptive (selective) peaking of video signals, particularly signals encoded and transmitted in accordance with MPEG and ATSC standards can be accomplished by obtaining or utilizing DCT coefficients for the signal, subjecting the coefficients to a threshold detector or spectral profile/histogram and selectively peaking portions of the signal when selected DCT coefficient values are detected. The peaking can be uniform or proportional to the DCT coefficients. Thus, analysis of the DCT coefficients at a signal receiver can be used to cause a peaking system to peak portions of a signal at image boundaries, but not portions of a signal corresponding to flat uniform images. In one preferred embodiment of the invention, if the amplitude of the high frequency horizontal (or vertical) frequency DCT coefficients exceed a pre-set threshold value, then the horizontal (or vertical) peaking circuit can be set for gain in proportion to how much the coefficients exceed the threshold. Alternatively, peaking can be performed in both the horizontal and vertical directions.

Digital video signals are conventionally transmitted as successive formatted N×N (typically 8×8) blocks of video pixel information. Each 8×8 block of video pixels contains 8 rows of horizontal pixels and 8 columns of vertical pixels and can be supplied to a discrete cosine transform (DCT) coder to develop an 8×8 block of 64 corresponding DCT coefficients. The analysis and corresponding amount of signal enhancement can be performed on a block-by-block basis to peak only selected portions of the signal.

The analysis of the DCT coefficients is not limited to mere threshold detection, but also bandwidth detection and spectral profile/histogram analysis. The coefficients can be analyzed for boundary or edge detection, as well as flat image detection. Also, the analysis of the DCT coefficients can occur for multiple frequency bands, including mid-frequency bands. Thus, if DCT coefficients fall within a mid-frequency band, a band pass filter can be applied to the video signal and peaking can be based on the band pass filter. Use of a low pass DCT coefficient threshold can be employed to disable peaking for flat video regions. Thus, the analysis of the DCT coefficients can be used to invoke various filter characteristics, such as high-pass, band-pass or low-pass characteristics, with various amounts of gain, which can be in proportion to the frequency characteristics of the DCT block under consideration.

Video signals transmitted in accordance with MPEG standards provide the DCT coefficients for adaptive peaking in accordance with the invention. However, the approach herein can also be applied to an analog video signal or signals that are not transmitted with DCT values. In the case of the analog video signal, the analog signal can be fed in parallel to a device which converts the analog signal to a digital signal, obtains the DCT coefficients, and then analyzes the coefficients as discussed herein to control an adaptive peaking filter in accordance with the invention for the spatial blocks corresponding to the DCT coefficient. The selected portions of the analog signal can then be peaked. Alternatively, the signal can be converted to a digital signal, the DCT coefficients can be obtained, adaptive peaking can be performed and the signal can be converted back to an analog with a digital-to-analog converter and sent to the image display.

The peaking method herein is particularly well suited for application to video signals, including those applicable for wideband high definition television systems (HDTV). Digital signals, such as those having very wideband (30 MHz) signals are conventionally compressed prior to transmission. Data Compression accordance with MPEG involves the generation of DCT. Principles of DCT coding are discussed in Rao and Yip, *Discrete Cosine Transform*, Academic Press (1990), "Digital Television Fundamentals" by Michael Robin and Michael Poulin, McGraw Hill, 1997 and WO 96/13780, the contents of which are incorporated herein by reference.

Aspects and embodiments of the invention will be described in accordance with the following descriptions and examples and with reference to the accompanying figures. However, the various embodiments discussed are for purposes of illustration only and are not to be construed in a limiting sense.

FIG. 1A is a block diagram of the components of a video receiver 100 which could be included in a television, such as an HDTV or a DVD player. A coded video bitstream signal 10 is supplied to a channel buffer 150 from a source which transmitted the signal as compressed coded information or from subjecting an uncoded signal to known coding methods. Channel buffer 150 transmits the coded signal to a variable length decoder (VLD) 160 which extracts the various individual code words. VLD 160 supplies a high level video coding information signal 161 to a DCT analyzer and peaking control processor 180. VLD 160 also supplies a signal 162 corresponding to quantized prediction error DCT coefficients in a quantized form to an inverse quantizer 140. VLD 160 also supplies a signal 163 corresponding to motion vectors to a motion compensator 130.

Inverse quantizer 140 supplies a signal 141 corresponding to the quantized prediction error DCT in a standard form to DCT analyzer and peaking control processor 180 and to an inverse discrete cosine transformer (IDCT) 120. IDCT 120 sends a signal 121 corresponding to pixel-by-pixel prediction errors, which had been degraded by quantization to an additive signal coupler 125. Signal coupler 125 also receives a signal 131 from motion compensator 130, corresponding to motion compensated predicted pixel values. Coupler 125 outputs a signal 126 corresponding to the decoded version of coded video signal 10. Decoded video signal 126 is supplied to an anchor frame storage signal processor 132, which supplies a signal 133 to motion compensator 130. Signal coupler 125 also supplies decoded video signal 126 to a programmable polyphase peaking filter 190. Peaking filter 190 is responsive to a downloadable peaking coefficients signal 181 from analyzer/processor 180. Signal 181 controls whether and to what extent peaking by filter 190 is applied to decoded signal 126 and filter 190 outputs a selectively peaked display signal 191 for activating a display 192. Display 192 can be mounted on the same frame or housing as the other elements identified above, or the selectively peaked signal can be carried to a separated display.

As shown in FIG. 1A, inverse quantizer 140 supplies DCT analyzer 180 with the DCT coefficients and the peaking control processor component of analyzer/processor 180 determines the peaking coefficients based on the outcome of DCT analysis. Polyphase peaking filter 190 is advantageously a known type of re-sampling filter that can operate with a different set of coefficients during a filtering operation. Such a filter is especially useful when a large number of filter taps are required to produce the desired filter response, such as for interpolation. It requires fewer computation elements than a straight-forward conventional filter. Polyphase filters are discussed in "Handbook of Digital Signal Processing Engineering Applications," edited by Douglas F. Elliott, Academic Press (1987), the contents of which are incorporated herein by reference.

FIG. 1B is a block diagram of receiver 100 modified to be a receiver 101 of an analog video signal 11. Receiver 101 includes an analog to digital (A/D) converter 151 for receiving analog video signal 11. A/D converter sends a converted digital signal 126' to peaking filter 190 and to DCT processor 152, which obtains the DCT coefficients from converted signal 126' and sends a signal 141 containing these coefficients to DCT analyzer/processor 180, which sends a signal 181 to peaking filter 140 to control when peaking of converted digital signal 126' is to occur. Peaking filter 190 transmits selectively peaked signal 191 to display 192.

In FIGS. 1A and 1B, the elements comprising a digital processor 102 can be implemented with discrete components. For example, inverse quantizer 140 can be implemented with an adder. IDCT 130 can be implemented by a dual DCT/IDCT IC. However, the state-of-the-art of IC technology has rendered the discrete implementation impractical. Thus, the functional blocks within the large box representing digital processor 102 can be integrated onto a single IC.

However, due to heavy integration, there is no single IC known to be currently available on the market today that can output DCT coefficient data through an external interface to the analyzer for processing. That is, because all of the processing is now done on one IC, the internal bus for the DCT coefficients is not brought out to pins on the IC. However those of ordinary skill in the art will understand that there is nothing sophisticated about implementing this. It will be understood that when discrete ICs are interconnected, the DCT bus can be tapped into and the DCT coefficient data fed to the processor.

To implement the adaptive peaking method without using a family of discrete components, one solution is to use a new class of programmable MPEG decoders, which will allow the internal CPU to have access to the DCT coefficients for analysis to determine the peaking level. Such examples are the Philips Semiconductor's TM1100 and TM1300 media processors.

The DCT analyzer and peaking control processor can be implemented completely in DSP software for flexibility. It is especially well suited for the programmable MPEG decoders that are entering the market. By implementing the algorithm in software, the application of adaptive peaking can be extended to the home PC when it is used for viewing streaming video or DVD.

Figure 1C:
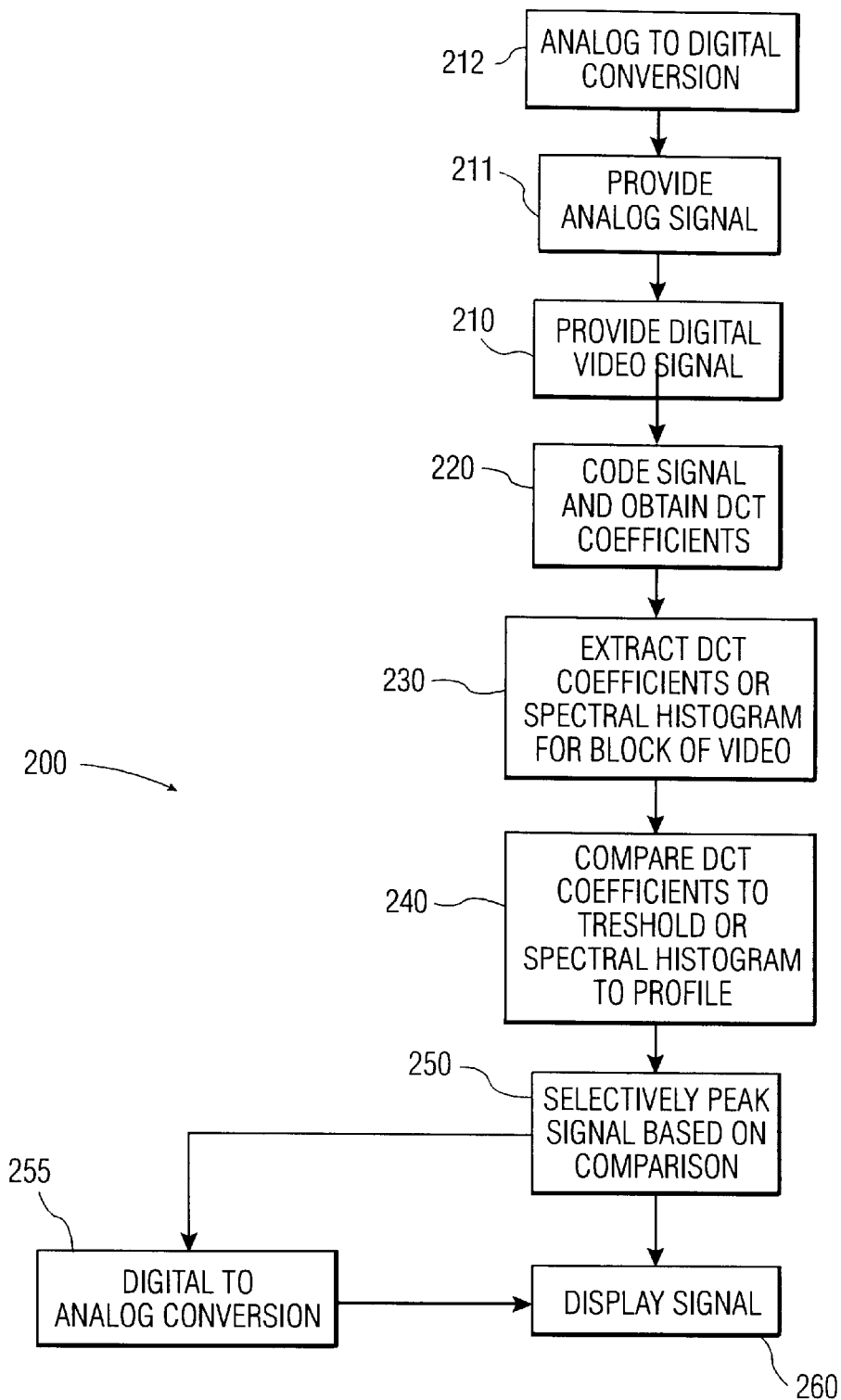
FIG. 1C is a flow chart identifying steps of a peaking method in accordance with preferred embodiments of the invention.

FIG. 1C is a flow chart for an adaptive peaking method 200 in accordance with preferred embodiments of the invention. Either a digital signal 210 is provided or an analog signal 211 is first converted in step 212 to a digital signal 210. Digital signal 210 is then coded and the DCT coefficients are obtained in step 220. In practice, the coding and generation of DCT coefficients is performed prior to broadcast or storage. In step 230, which can be performed with a VCR, DVD or TV, the chrominance and/or luminance DCT coefficients or a spectral histogram for blocks of video are extracted. In step 240, the DCT coefficients are compared to a threshold or the spectral histogram is compared to a profile. In step 250, the chrominance and/or luminance signal is selectively peaked, based on the comparison of step 240. If the signal is to be displayed in an analog device, in step 255, the signal can be converted to an analog signal and in step 260, the selectively peaked signal is displayed.

Methods for analyzing the DCT coefficients and adaptively peaking the decoded video signal in response to the peaking coefficients from the peaking control processor in accordance with preferred embodiments of the invention are described below, with reference to FIGS. 2 to 20B.

Adaptive peaking in accordance with the invention advantageously employs DCT coefficient values to determine whether to and the extent to which a portion of a signal should be peaked. The DCT coefficients for a given block of video correspond directly to the frequency domain. Thus, the DCT coefficients of a video signal that has been encoded using the DCT can be analyzed to determine the amount of peaking to apply in both the horizontal and vertical directions. For example, with respect to a flat field (or block) no edges and little or no high frequency components, the peaking filter can be temporarily disabled or even set for attenuation of high frequencies. This helps prevent the amplification of high frequency noise that would have been amplified by a conventional peaking filter. If the analysis of the DCT coefficients indicates significant high frequency information, by virtue of high amplitude DCT coefficients, the adaptive peaking circuit can be set for standard or proportional signal enhancement. This enhancement can be applied in the horizontal direction, the vertical direction or both, based on the analysis of the DCT coefficients, on a block-by-block basis.

The analysis of the DCT coefficients is not necessarily limited to high frequency detection. For example, the coefficients can be analyzed in the mid-band region and a corresponding band pass filter can be introduced in the video path prior to display, where the coefficients (or gain) of the adaptive band pass filter can be adjusted, based on the energy levels characterized by the mid-range DCT coefficients. Thus, mere noise in the band of interest will not be amplified when there is no video frequency content present in the band of interest.

Figure 2:
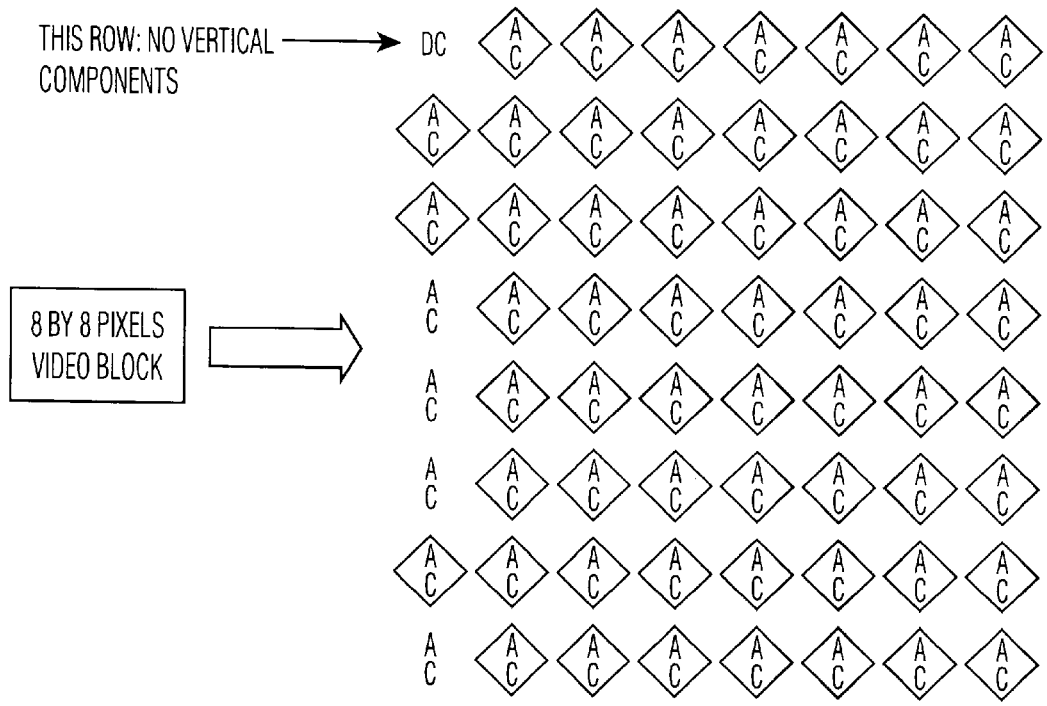
FIG. 2 is a diagram showing DCT coefficients arranged in 8×8 blocks.
Figure 3:
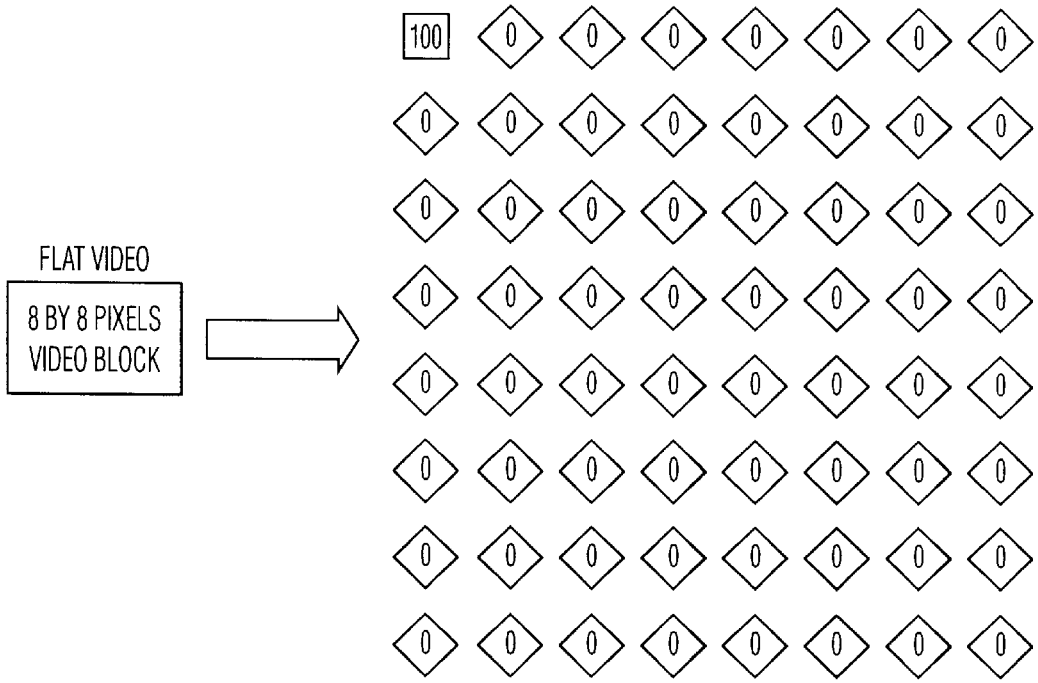
FIG. 3 is a diagram showing representative DCT coefficients for an 8×8 block of a flat video signal.

Referring generally to FIGS. 2–5, DCT coefficients are shown arranged in 8×8 blocks. Each coefficient represents a particular frequency segment. As shown in FIG. 2, the first DCT coefficient is referred to as the DC coefficient. It represents the average value of the entire 8×8 video block.

Figure 4:
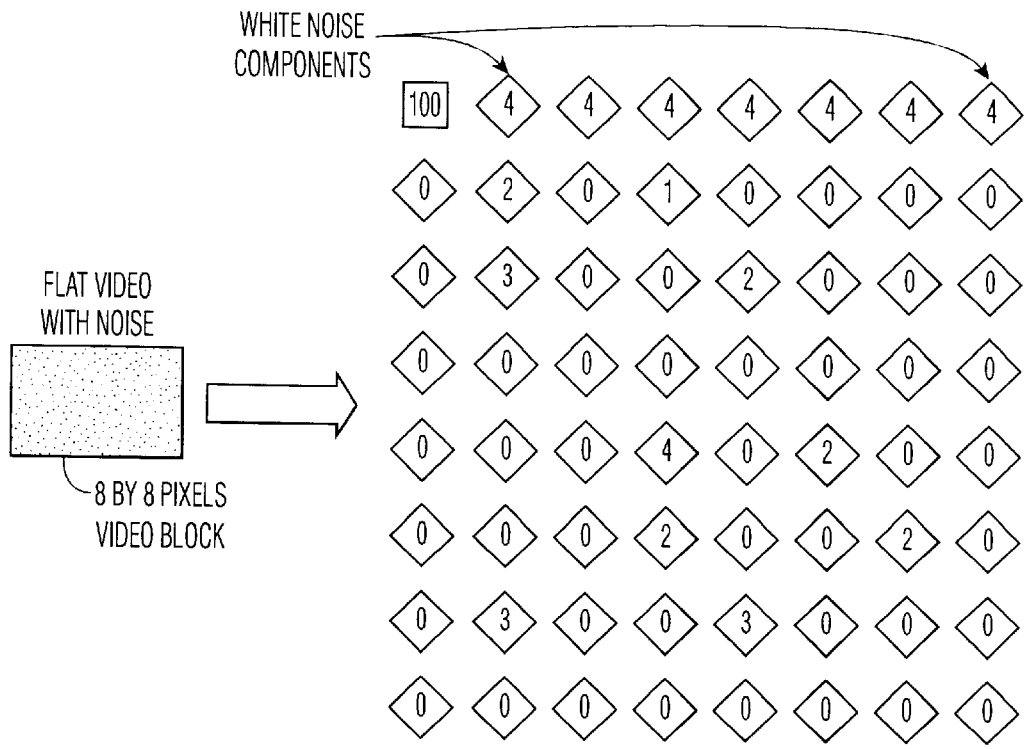
FIG. 4 is a diagram showing DCT coefficients for an 8×8 block of a flat video signal with noise.
Figure 5:
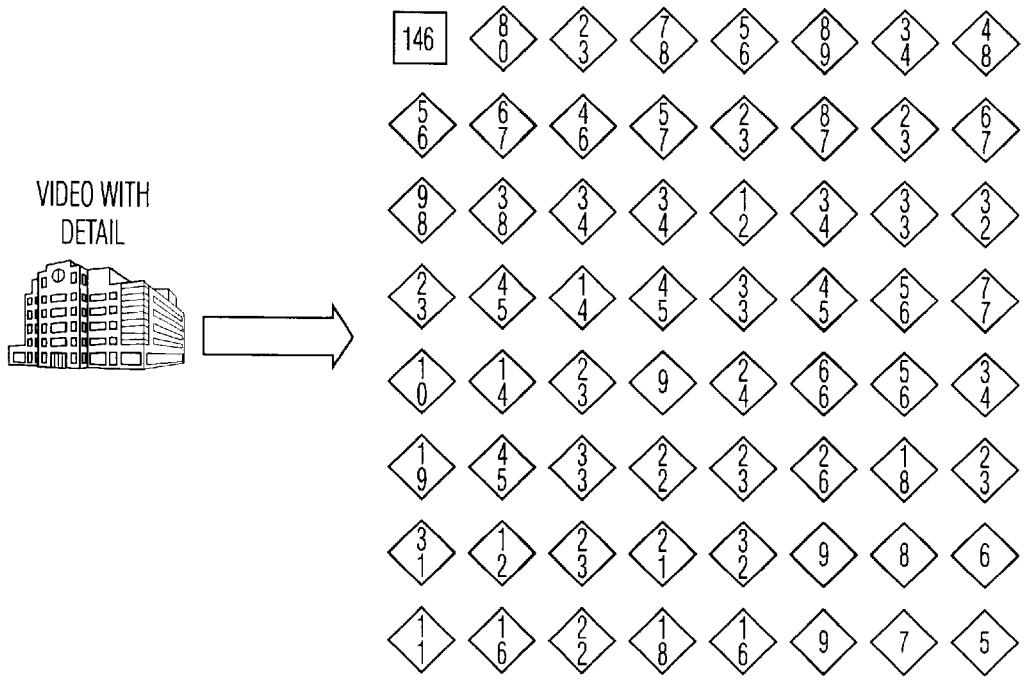
FIG. 5 is a diagram showing DCT coefficients for an 8×8 block of a video signal with detail.

Each subsequent DCT coefficient is referred to as an AC coefficient. The higher the magnitude of the AC coefficients, the more detail is present in the 8×8 video block. Thus, for a flat signal with no noise, each AC coefficient will be 0. For example, referring to FIG. 3, an 8×8 block representing a flat video signal will have a DC coefficient, in this case one hundred, and each of the AC coefficients will be zero. Referring to FIG. 5, an 8×8 video block having high detail will have many high amplitude AC coefficients. If there is noise present in the video signal, the AC coefficients will vary by small amplitudes, caused by the noise. For example, FIG. 4 presents the DCT coefficients for a flat signal and thus, each AC component should be zero. Thus, each AC component shown in FIG. 4, which is not zero, results from noise in the signal.

Figure 6A:
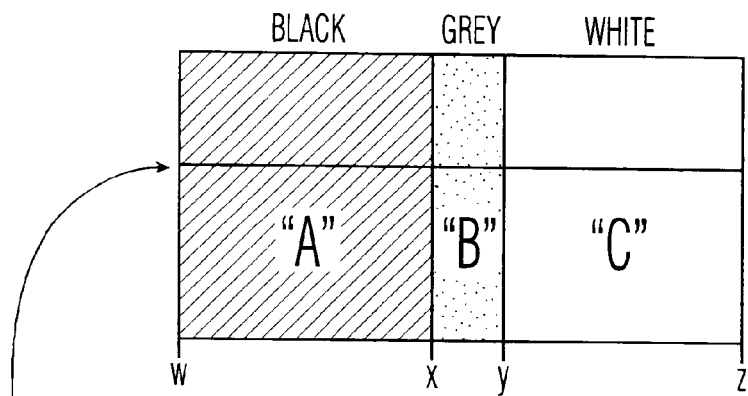
FIG. 6A is a demonstrative view of a screen displaying a video signal, in which the signal includes no noise and no peaking.

FIG. 6A depicts a television screen. Region A is entirely black (lowest luminance), when viewed horizontally from point w to point x. Region C is entirely white (highest luminance), from point y to point z. Region B is the transition or edge between Regions A and C and extends from point x to point y. Region B is displayed as changing gray values.

Figure 6B:
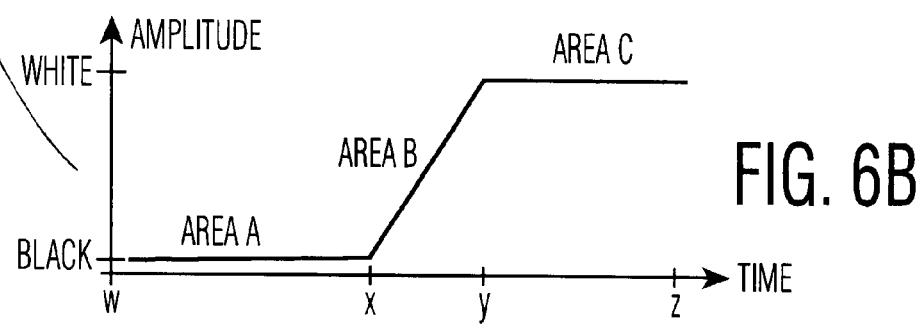
FIG. 6B is a graph showing the change in luminance from black to white, with time, of the video signal corresponding to the image of FIG. 6A.

FIG. 6B shows the raster scan line as the change in luminance from zero (black) to maximum (white) with time. Area A in FIG. 6B corresponds to the black region in the screen of FIG. 6A. Area B corresponds to the edge or gray area and Area C corresponds to the white portion.

Figure 6C:
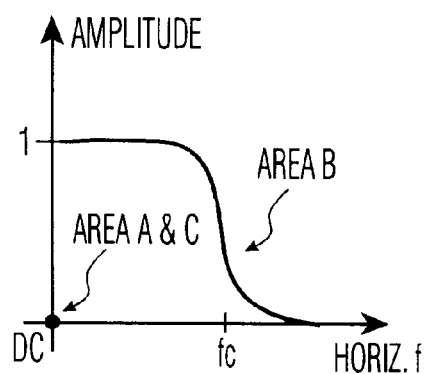
FIG. 6C is a graph showing the change in amplitude with frequency of the signal of FIG. 6B.

FIG. 6C shows the scan line in the frequency domain, for example, on a spectrum analyzer. Areas A and C correspond to flat video signals and contain no components other than DC, i.e., all AC values are zero. Hence, both Regions A and C would appear as a dot at the origin of FIG. 6C. Edge transition Region B includes spectral components from DC to some cut-off frequency ($f_c$). Thus, the AC values of the signal correspond to the edge between Regions A and C on the screen, and have an amplitude greater than zero.

Figure 7A:
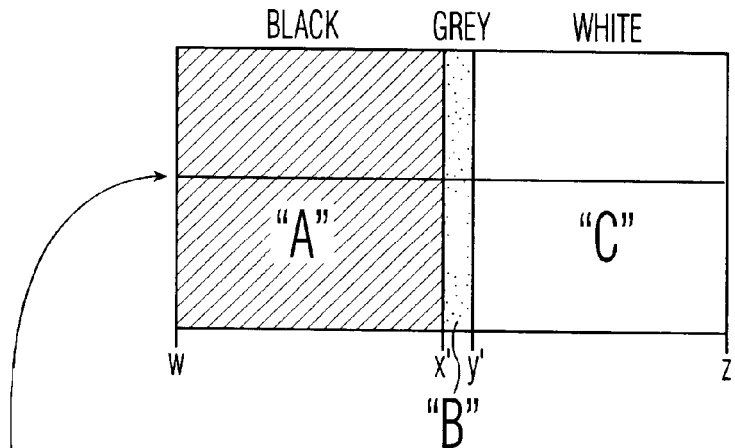
FIG. 7A is a demonstrative view of a screen displaying a video signal corresponding to the signal of FIG. 6B, after conventional peaking.
Figure 7B:
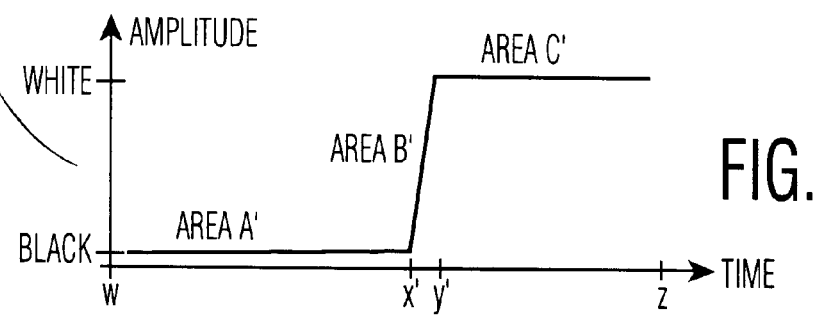
FIG. 7B is a graph showing the change in luminance from black to white with time, of the display of FIG. 7A, which includes conventional peaking.
Figure 7C:
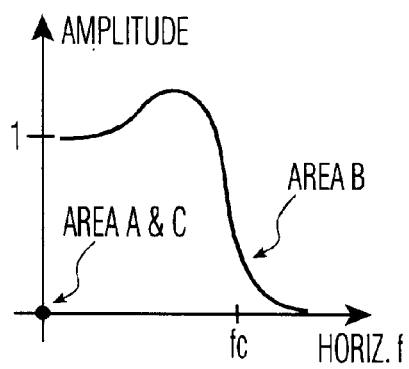
FIG. 7C is a frequency domain graph corresponding to the signal of FIG. 7B.

FIG. 7A shows how the image from the screen of FIG. 6A would appear after the signal of FIG. 6B is enhanced with conventional peaking from a high pass filter. As is evident, signal transition Region B has become smaller. As shown on FIG. 7B, the slope of the edge between black Region A and white Region C has become sharper as a result of peaking in this region. Referring to FIG. 7C, it can be seen that the black and white areas (those at DC) remain constant and that the components resulting from the edge in Area B become peaked, as shown in the bump in the frequency spectrum.

Figure 8A:
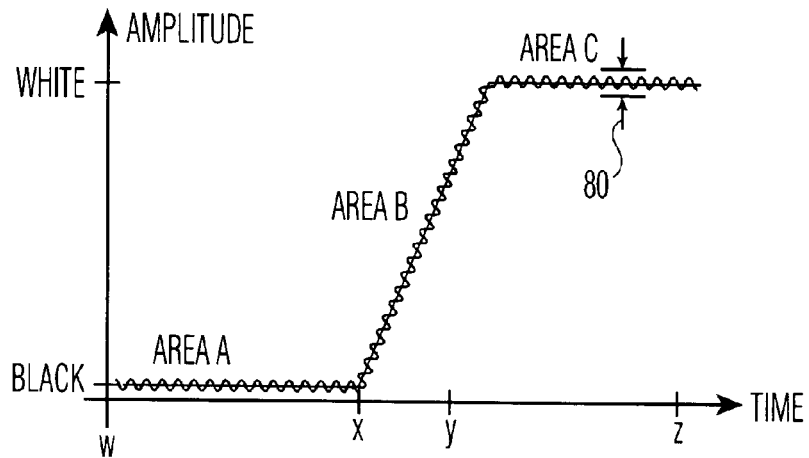
FIG. 8A is a graph showing the change in the luminance from black to white, with time, of a noisy video signal without peaking.
Figure 8B:
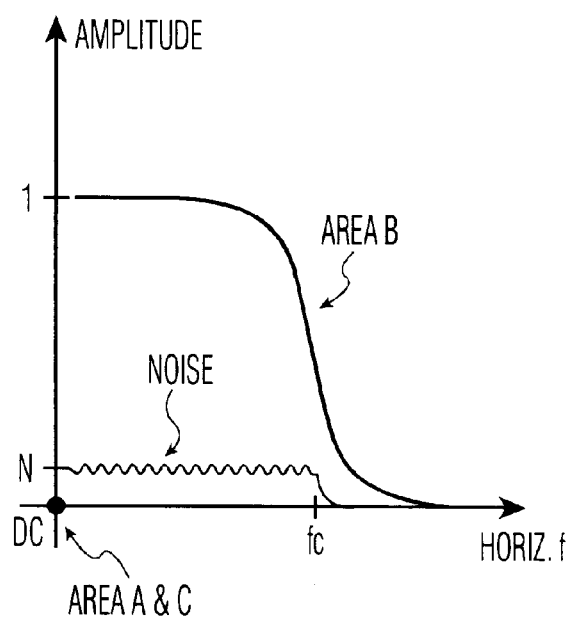
FIG. 8B shows the frequency domain for the signal of FIG. 8A.

FIG. 8A shows a scan line for a signal corresponding to that of FIG. 6B, but with noise. FIG. 8B shows the frequency domain, where there is a component at DC contributed from the black and white areas A and C respectively; components from DC to cut-off frequency ($f_c$) contributed by edge transition Area B and the noise floor, which is assumed to be white noise with flat spectral components across the frequency band. Note, however, that the noise can also be bursty in time or focused in certain frequency bands. However, advantages in accordance with the invention are best observed when a video signal includes white noise.

Figure 9A:
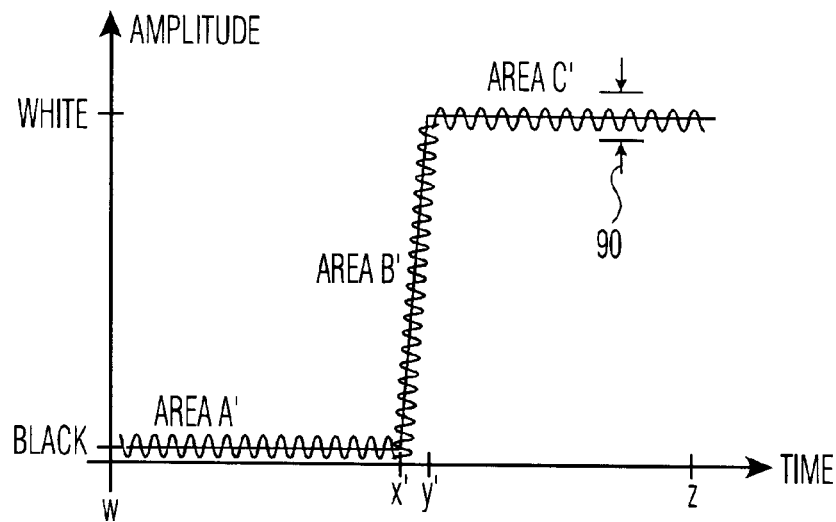
FIG. 9A shows the change in luminance from black to white, with time, for a noisy video signal which was subjected to peaking.

FIG. 9A shows the scan line for the signal of FIG. 8A, after conventional peaking is performed. As a result of peaking, caused by white noise, a noise envelope 90 of the peaked signal of FIG. 9A is larger than a noise envelope 80 of the unpeaked signal of FIG. 8A. Thus, although the edge between black Area A' and white Area C' is sharpened, the noise present in Areas A' and C' has been increased. As noted above, noise present in flat video regions can be particularly objectionable.

Figure 9B:
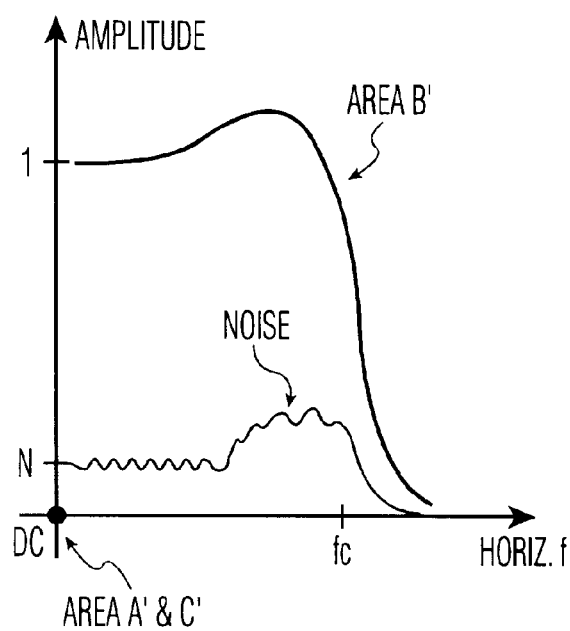
FIG. 9B shows the frequency domain for the signal of FIG. 9A.

FIG. 9B shows the frequency domain for the signal of FIG. 9A. It can be seen that the noise floor has been raised for those spectral components in the range of the peak resulting from the high pass filter. However, because the noise is spatially present across the entire raster scan line, the noise will be enhanced (peaked) even in flat video portions corresponding to Areas A' and C'.

Figure 10A:
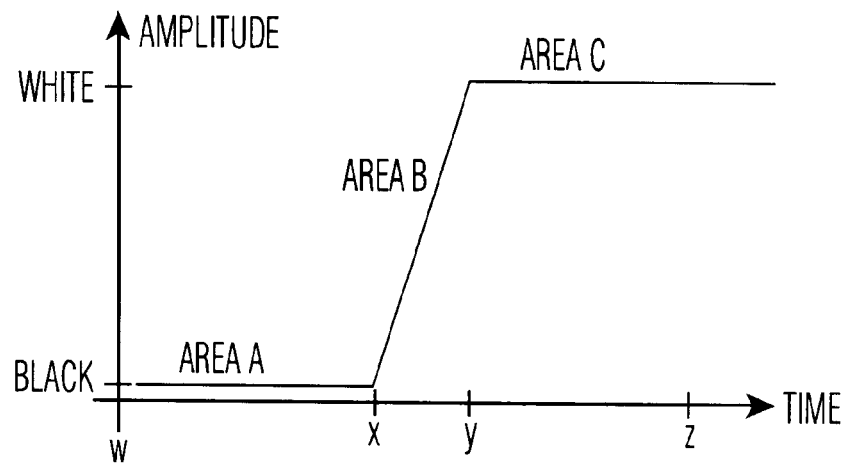
FIG. 10A shows the change in luminance from black to white, with time, of a video signal without noise and without peaking.
Figure 10B:
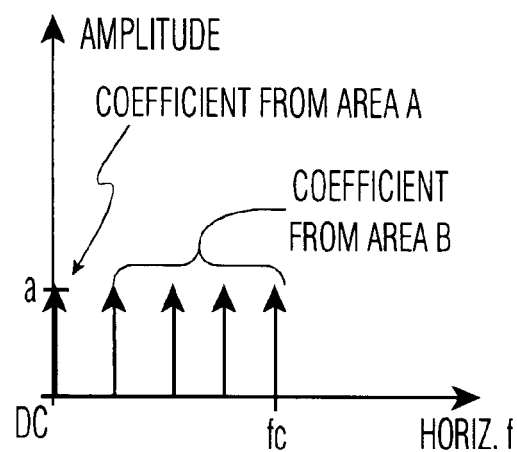
FIG. 10B shows the DCT coefficients of the signal of FIG. 10A, with high horizontal frequencies detected in area B only.

FIGS. 10–12 show advantages of adaptive peaking in accordance with preferred embodiments of the invention. FIG. 10A shows the signal diagram for the signal of FIG. 6B, which has no noise. FIG. 10B depicts the DCT coefficients resulting from the scan line of FIG. 10A. As shown in FIG. 10B, the DC DCT coefficient of Areas A and C is represented as value a. Edge region B results in spectral content across the desired frequency band as shown in coefficients b. Thus, when the DCT coefficients that spatially are generated in edge Region B are analyzed, high frequency energy (DCT coefficients) is detected as being present.

Figure 11A:
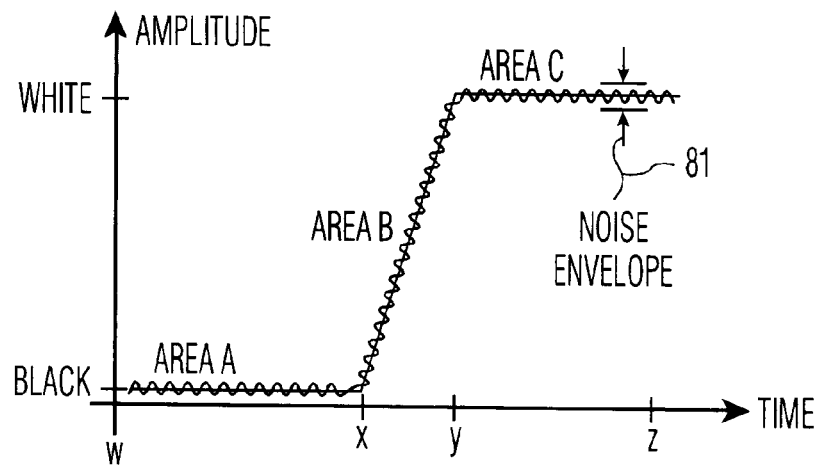
FIG. 11A shows the change in luminance with time of a video signal corresponding to the signal shown in FIG. 10A, but with noise.
Figure 11B:
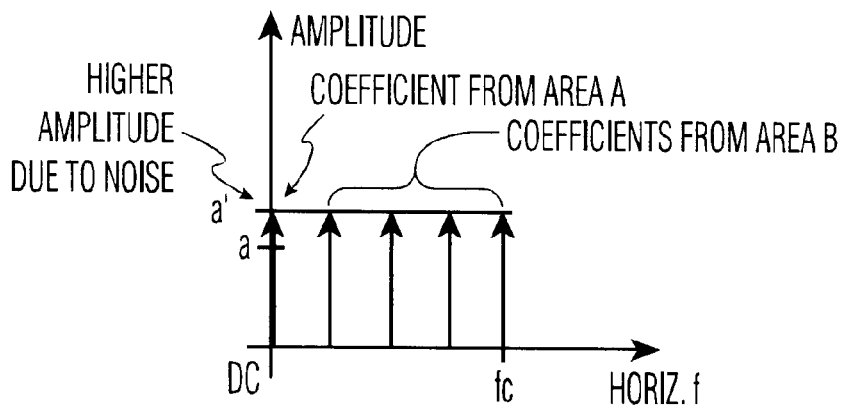
FIG. 11B shows the DCT coefficients of the signal of FIG. 11A with high horizontal frequencies detected in area B.

FIG. 11B shows the scan line for a signal corresponding to the signal of FIG. 10A, but for a noisy signal with a noise envelope 81. As shown in FIG. 11B, the white noise causes the amplitude in the frequency domain of all of the DCT coefficients to be increased slightly, to value a', because the white noise is flat across the frequency band. However, the high frequency DCT coefficients will only be present when the signal corresponding to Area B is being processed, because the amplitude of the DCT coefficients corresponding to Areas A and C will be below the pre-set threshold. Thus, when processing the signal corresponding to Areas A and C, there will be only the DC coefficient and these portions of the signal will not be peaked, whereas portion of the signal corresponding to edge region B will be peaked.

Thus, FIGS. 10A, 10B, 11A and 11B show how the concept of peaking a video signal in accordance with preferred embodiments of the invention can be implemented, first without considering the addition of noise to the signal (FIGS. 10A and 10B and then with noise in FIGS. 11A and 11B. Because the example source video signal shown only contains horizontal transitions and no vertical detail, only the horizontal DCT coefficients corresponding to horizontal DC are discussed. However, the concept can be readily expanded to include vertical DCT coefficients, to enhance vertical details as well as diagonals. Thus, by using the concept that high frequency DCT coefficients are only present in the area of detail (Region B) as opposed to flat video (Regions A and C), and peaking is only applied when processing the signal corresponding to Region B, only noise in the area of transition is amplified. Noise in such an area is subjectively less objectionable than raising the noise floor in flat Areas A and C.

Figure 12A:
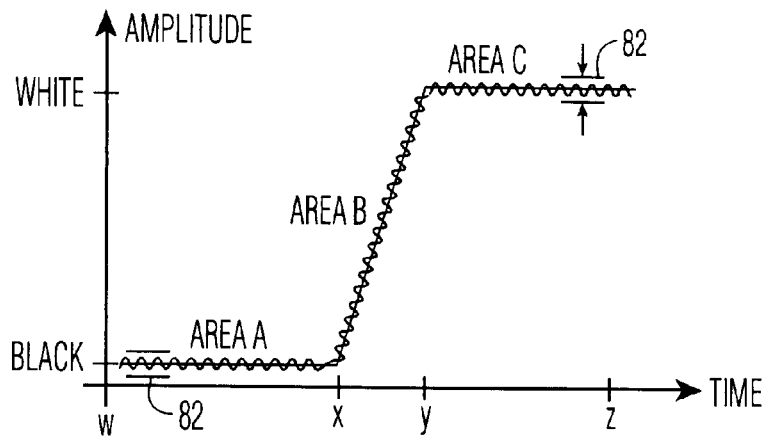
FIG. 12A shows the change in the amplitude of the luminance component of a video signal with time, for a signal corresponding to that shown in FIG. 11A.
Figure 12B:
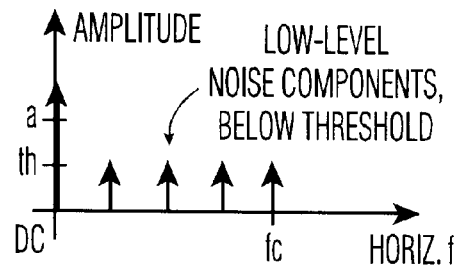
FIG. 12B shows the DCT coefficients for the signal corresponding to area A of FIG. 12A.
Figure 12C:
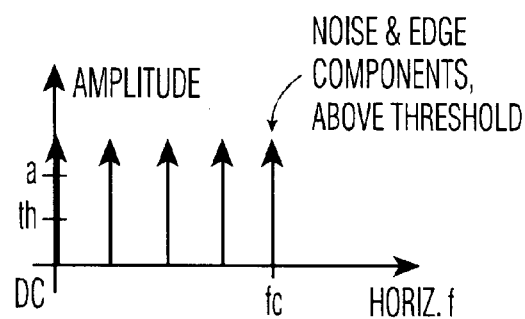
FIG. 12C shows the DCT coefficients for the signal corresponding to area B of FIG. 12A.
Figure 12D:
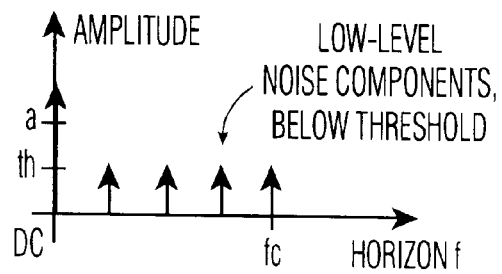
FIG. 12D shows the DCT coefficients for area C of the signal corresponding to FIG. 12A.

FIG. 12A shows a noisy video signal corresponding to the signal of FIG. 11A. FIG. 12B shows that the amplitude of the DCT coefficients for Area A (point w to point x) is below threshold amplitude th. Thus, the DCT coefficients corresponding to the noise in Region A will fall below the DCT coefficient threshold and the system will not apply peaking to this portion of the signal. Referring to FIG. 12C, the DCT coefficients for Region B (points x to y) exceed threshold amplitude th. Thus, peaking will be applied to this portion of the video signal. Referring to FIG. 12D, because the noise component of Region C is not sufficient to raise the DCT coefficient above the threshold value, peaking will not be applied to this portion of the signal.

Figure 12E:
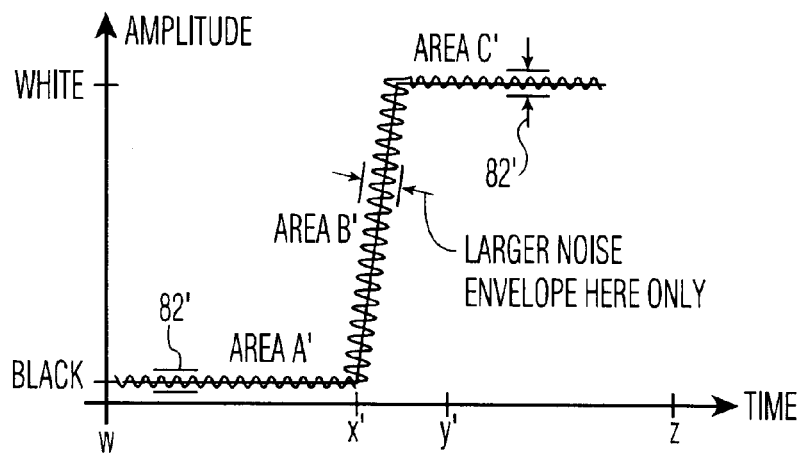
FIG. 12E shows the change in the luminance component of the video signal of FIG. 12A, after peaking in accordance with a preferred embodiment of the invention has been applied.

FIG. 12E shows the application of adaptive peaking in accordance with preferred embodiments of the invention to the signal of FIG. 12A. Areas A' and C' will not be peaked and thus, noise envelope 82 of FIG. 12(a) will be the same as noise envelope 82' of FIG. 12E for the flat regions. The noise envelope in Region B' will be larger. However, noise in this region is subjectively less objectionable.

In a preferred embodiment of the invention, the selective peaking of the luminance peaking filter can be under the control of the spectral histogram of the chrominance energy present in the image, for a section of video signal data. The luminance filter can be applied in either the horizontal or vertical directions, but is preferably applied in both the horizontal and vertical directions to affect both the vertical and horizontal edges of the image displayed.

In preferred embodiments of the invention, the chrominance signals can be selectively peaked. The spectral histogram of chrominance energy present in a portion of an image can be ascertained, such as by analyzing the chrominance I-frame DCT coefficients, in the case of MPEG compressed video signals. An I-frame, also known as an Intra-frame is an intra-coded video frame that is independent of other video frames in MPEG standard. I-frame is repeated at a regular interval to refresh the coding sequence. A frame refers to a complete television picture and can consist of an interlaced field of odd numbered lines and even numbered lines. In an NTSC or other interlaced television picture, a field refers to one set of the odd or even numbered lines, the frame containing both even-numbered and odd-numbered lines. Between any two I-frames are P-frames (predictive frames) and B-frames (by-directional predictive frames). P- and B-frames contain only information with respect to changes between the two I-frames. An I-frame, with its P- and B-frames, is called a GOP (Group of Pictures).

The chrominance spectral histogram of an I-frame has been determined to be a highly reliable measure of the overall quantization which has been applied to the chrominance signal. For example, if the chrominance histogram of low frequency components matches a pre-established pattern, the degree of chrominance quantization can be estimated. Therefore, strategies can be established to applying appropriate amounts of peaking, based on the spectral histogram matching result. Furthermore, the peaking control can be refined, based on comparing the spectral histogram to a predetermined threshold.

By way of example, if the chrominance energy of certain portions of the chrominance spectral histogram in the I-frame exceeds a threshold value, the peaking filter can be applied in the luminance path, chroma path or both. Two make this comparison, the DCT coefficients of the chroma-difference signals are examined for every I-frame. High DCT coefficients will signify significant high-frequency color difference energy and signify that the section of the video signal (block of video data), being analyzed is at a chrominance edge that should be peaked. On the other hand, low level DCT coefficients signify that there is little high-frequency chrominance energy, and that peaking in the luminance and/or chrominance path for this "flat" portion of the video signal can be moderated or eliminated completely. The effect of this processing is to apply only signal enhancement (peaking) to portions of the video signal corresponding to details of a saturated image. On the other hand, peaking will not be applied or at least moderated for flat fields of color or portions of the field that are flat with color, where it is not desirable to apply peaking, because peaking in that region can increase objectionable noise, particularly in an area of a red flat field of color.

Implementation of adaptive peaking based on chrominance energy can advantageously take place at the I-frame rate. Hence, the comparison and selective peaking will be applied across an entire GOP, rather than affecting the signal at a higher rate. This is advantageous, because the rate of change of the filter characteristics should be at a relatively slow rate, so as not to cause artifacts of the filter characteristics, which can occur if the filter characteristics change too rapidly.

Thus, after the digital luminance signal is reconstructed by a decoder, an adaptive horizontal and vertical filter is advantageously inserted in the luminance path. The adaptation of these filters is controlled by the spectral histogram and the amount of energy in the chrominance difference signals present in the I-frame (for MPEG-encoded video). The spectral histogram and energy in the chrominance difference signals is determined by examining the I-frame DCT coefficients. Selective peaking is then applied in cases where the high frequency horizontal or vertical coefficients match certain histogram patterns or exceed a given threshold.

Figure 13:
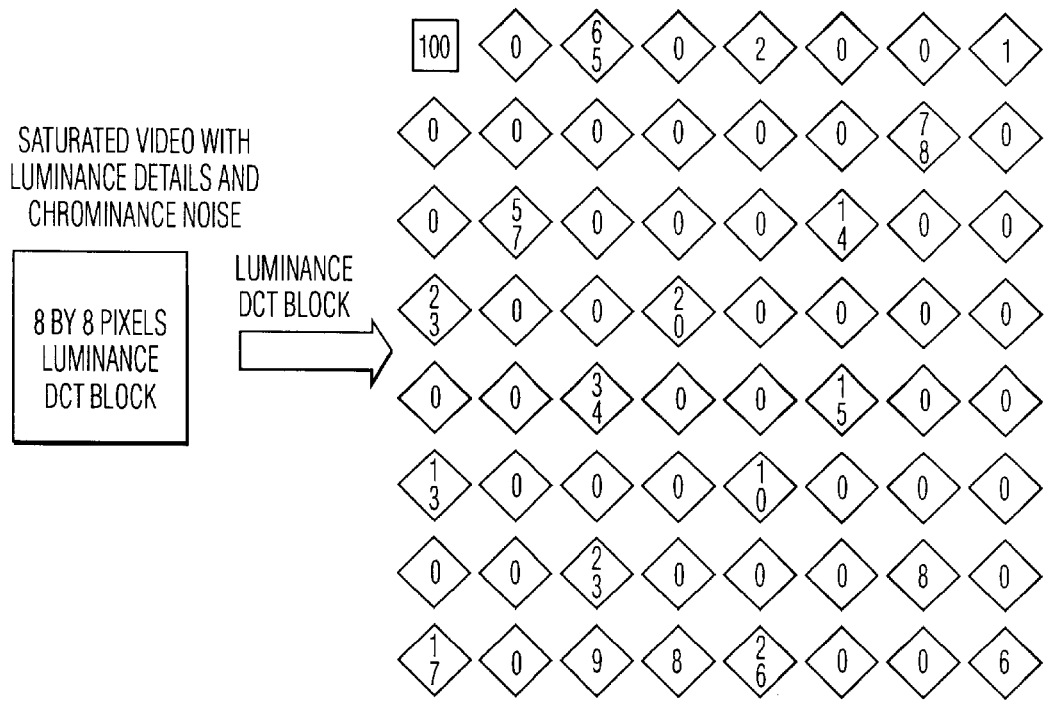
FIG. 13 is a diagram showing the luminance DCT coefficients for saturated video with luminance detail and chrominance noise.
Figure 14:
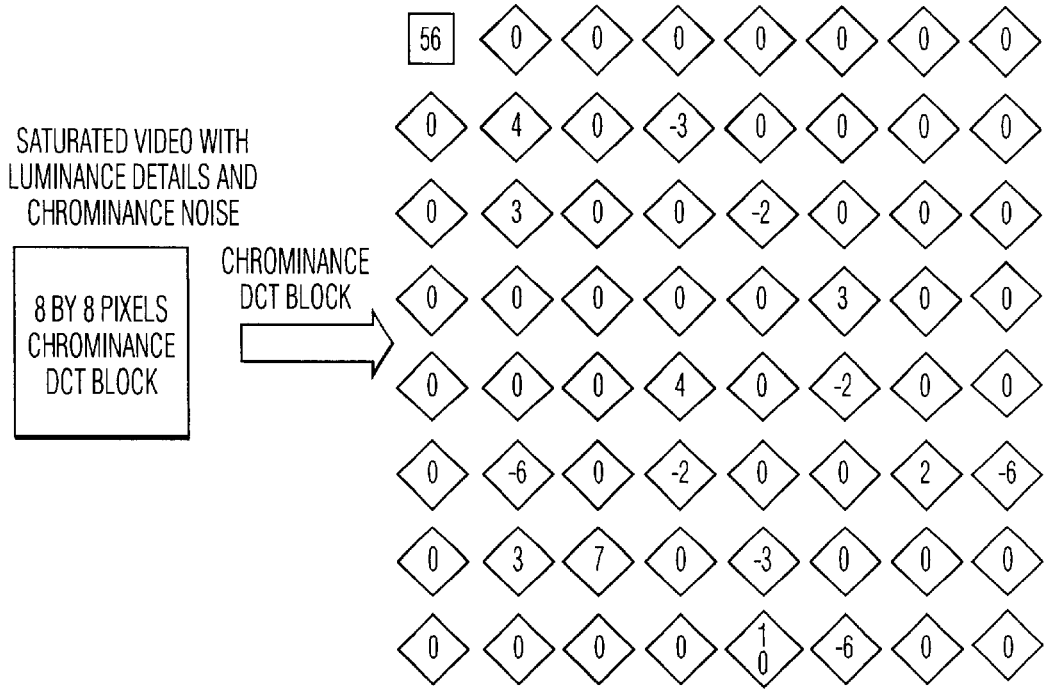
FIG. 14 is a diagram showing the chrominance DCT coefficients for the signal of FIG. 13.
Figure 15:
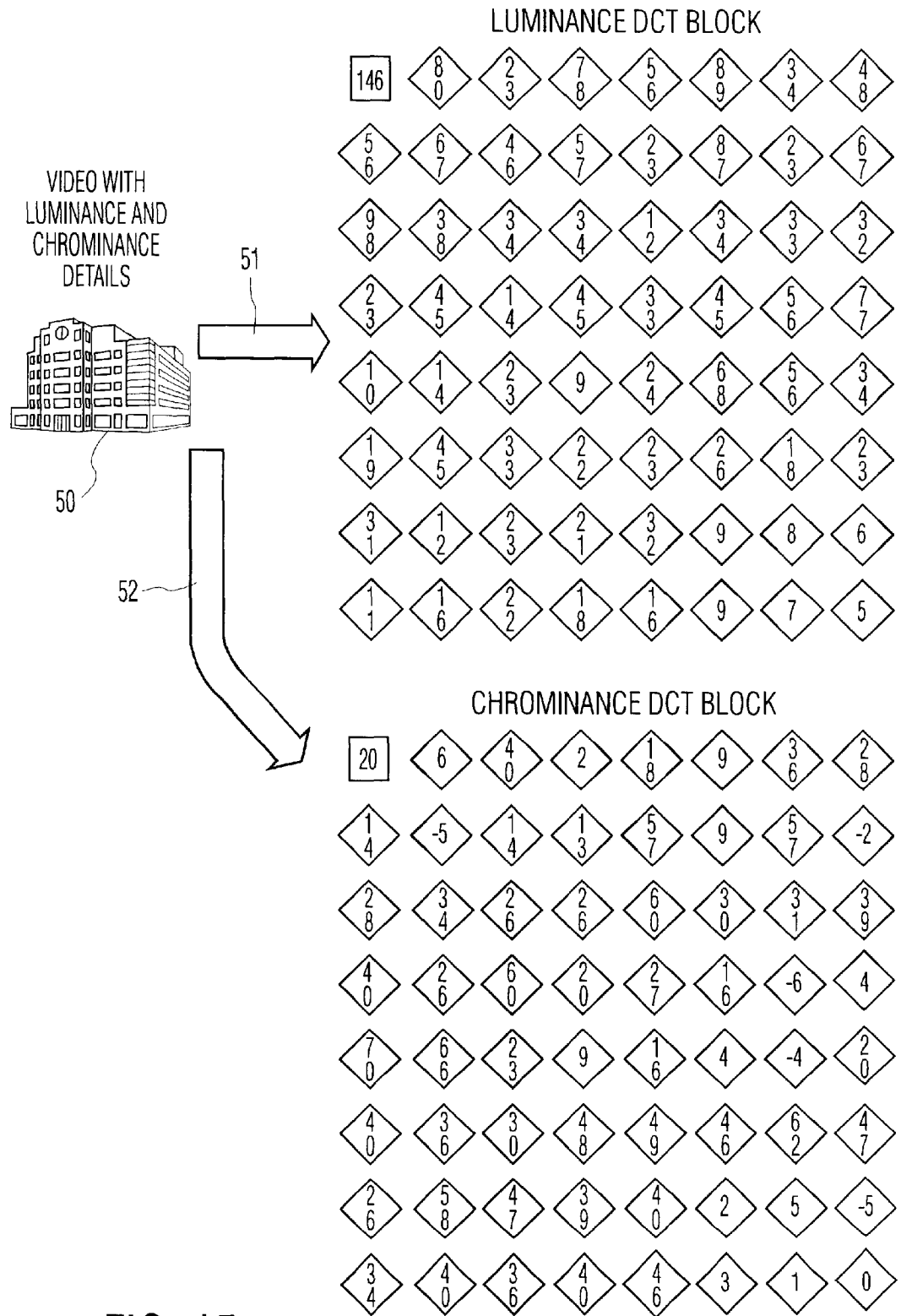
FIG. 15 is a diagram showing the luminance DCT coefficients and the chrominance DCT coefficients for a video signal with both luminance and chrominance details.

Adaptive peaking based on the chrominance component of a video signal, in accordance with preferred embodiments of the invention, is shown in FIGS. 13–20B. FIG. 13 shows the DCT coefficients for an 8 by 8 pixel block of a saturated video signal with luminance details and chrominance noise. FIG. 14 shows characteristic chrominance DCT coefficients for an 8×8 pixel block. FIG. 15 shows the DCT coefficients for a luminance DCT block 51 and a chrominance DCT block 52 for a video signal corresponding to a portion of an image 50 with both luminance and chrominance details.

Figure 16A:
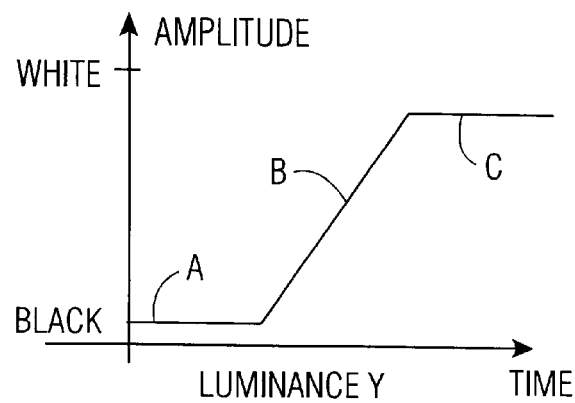
FIG. 16A is a graph showing the change in luminance with time for a video signal.
Figure 16B:
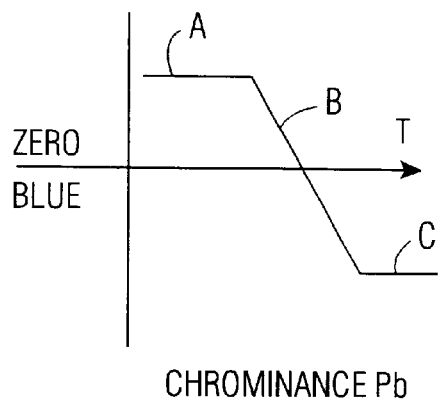
FIG. 16B shows the change in chrominance $P_b$ with time for a video signal.
Figure 16C:
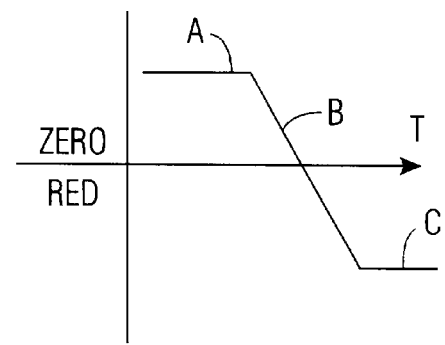
FIG. 16C shows the change in chrominance $P_r$ with time for a video signal.

The amplitude of a luminance and chrominance signal, with time, is shown in FIGS. 16A, 16B and 16C. Digital signal processing is not done in the RGB domain. Accordingly, the signal is first transformed into the $YP_bP_r$ domain, in which Y stands for the luminance signal, $P_b$ stands for the blue chrominance signal and $P_r$ stands for the red chrominance signal. The chrominance signal is a bipolar signal between two opposite colors, in which zero is the ½ level between the two opposite colors. As can be seen in FIGS. 16A–16C, regions A and C represent flat regions without detail and region B represents an edge transformation zone between regions A and C. Thus, FIGS. 16A–16C represent the $YP_bP_r$ graphs for a color video signal with an edge region.

Figure 17A:
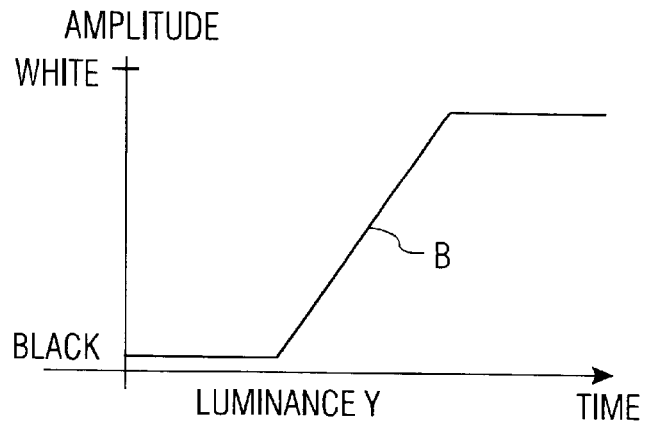
FIG. 17A shows the change in luminance with time for a video signal.
Figure 17B:
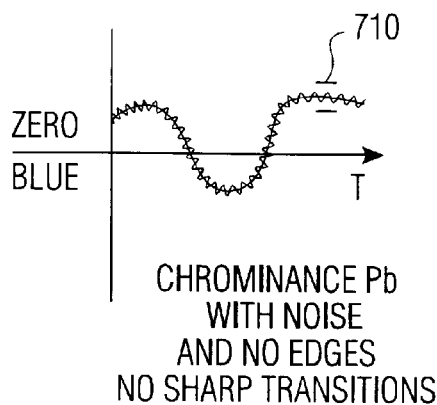
FIG. 17B shows the change in chrominance $P_b$ with time for a noisy video signal.
Figure 17C:
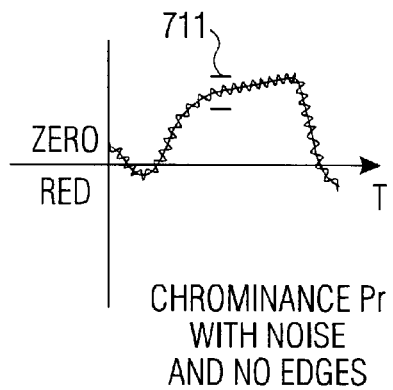
FIG. 17C shows the change in chrominance $P_r$ with time for a noisy video signal.
Figure 17D:
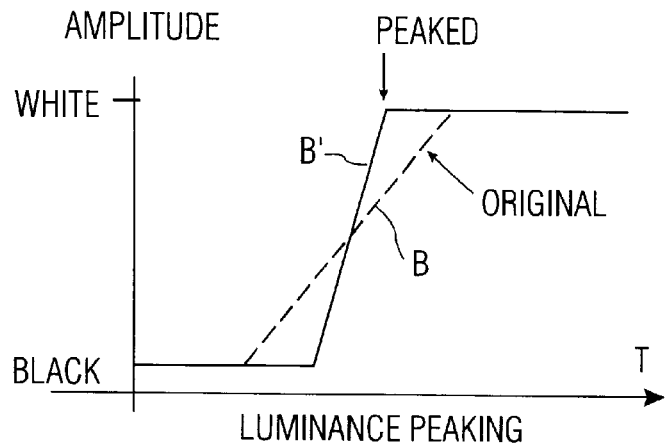
FIG. 17D shows the effects of adaptive peaking in accordance with a preferred embodiment of the invention on the signal of FIG. 17A.
Figure 17E:
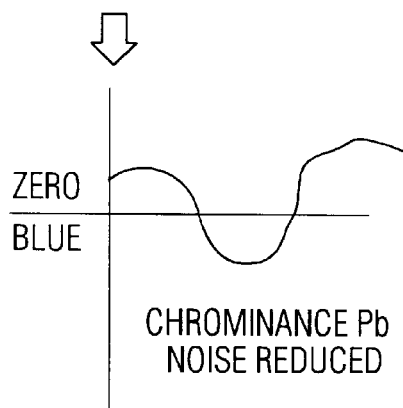
FIG. 17E shows the effects of a noise filter on the signal of FIG. 17B.
Figure 17F:
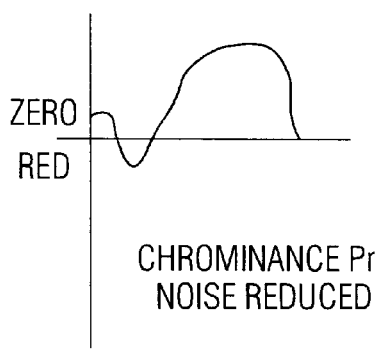
FIG. 17F shows the effects of a noise filter on the signal of FIG. 17C.

FIGS. 17A, 17B and 17C represent the $YP_bP_r$ domains for a color video signal without a sharp transition and thus, no edge regions, but with noise, represented by noise envelopes 710 and 711. The time scale of FIGS. 17A–C is much larger than that of FIGS. 16A–C. FIG. 17D shows the result of peaking the signal of FIG. 17A. It can be seen that the slope of area B has been increased, to sharpened edge region B'. However, peaking can increase the noise envelope of the $P_b$ and $P_r$ signals and thus, it is advantageous to include a noise filter to reduce the chrominance noise for the $P_b$ and $P_r$ signals.

Figure 18A:
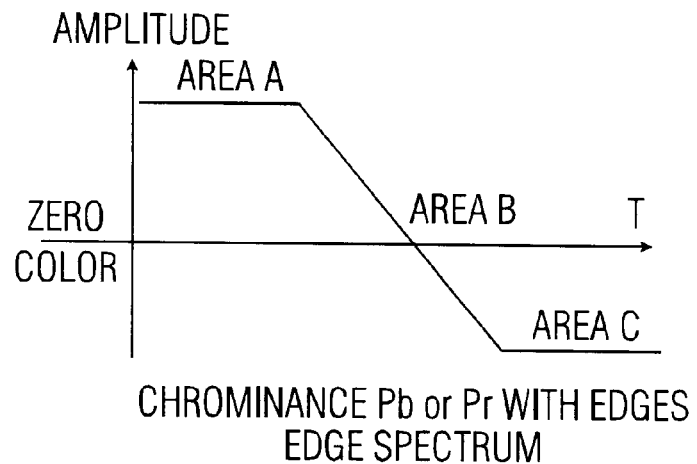
FIG. 18A shows the change in chrominance with time for a $P_b$ or $P_r$ signal having an edge color transition.
Figure 18B:
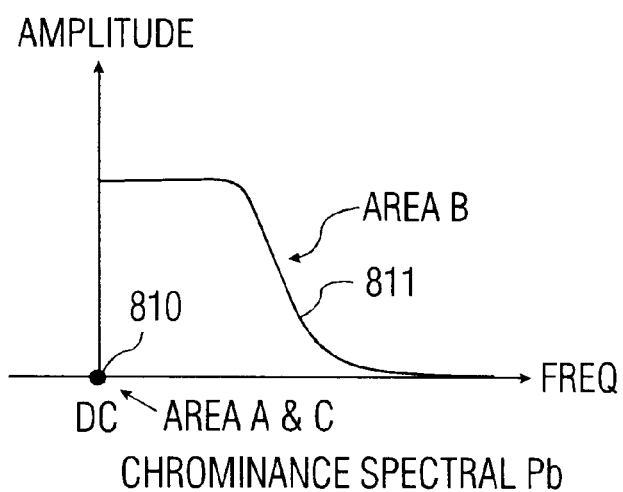
FIG. 18B shows the chrominance spectral plot for the signal of FIG. 18A.
Figure 19A:
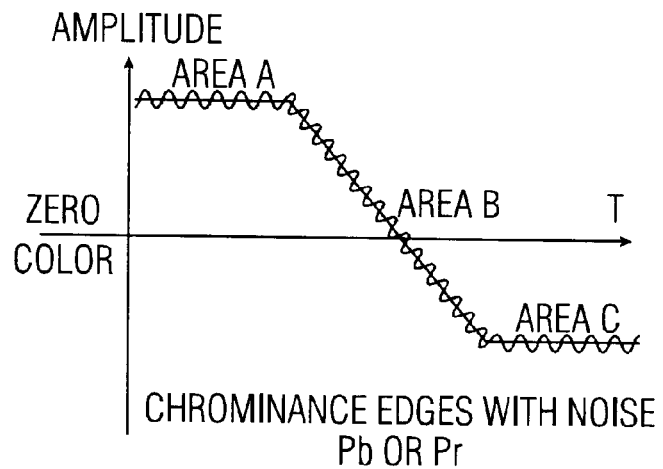
FIG. 19A shows the effects of noise on the signal of FIG. 18A.
Figure 19B:
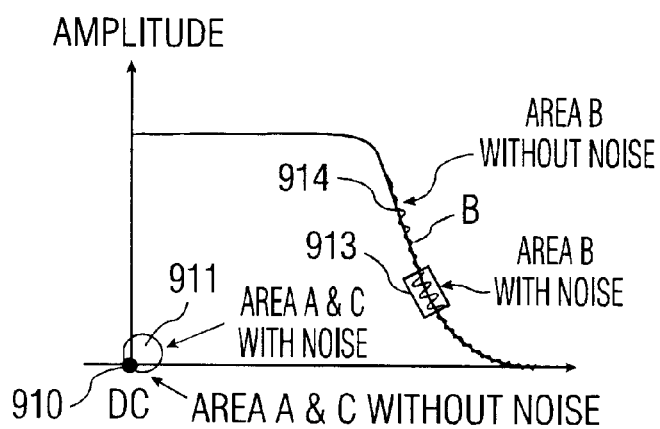
FIG. 19B shows the chrominance spectral plot of the signal of FIG. 19A and how such signal would be affected by a noise filter.

FIG. 18A shows either chrominance signal $P_b$ or $P_r$ with flat color regions A and C and edge transition region B. The frequency components for the signal of FIG. 18A is shown in FIG. 18B. Areas A and C are flat, and their chrominance spectral plot is represented by point 810. The chrominance spectral plot for edge region B is shown as curve 811. FIG. 19A shows the $P_b$ or $P_r$ curve for a chrominance signal with a flat area A, an edge area B and a flat area C, for a signal with noise. FIG. 19B shows the chrominance spectral plot for the signal of FIG. 19A. Point 910 shows the plot of areas A and C without noise, or after the effects of a noise filter.

Area 911 represents the chrominance spectral plot for areas A and C, taking noise into account. FIG. 19B also shows that a noise envelope 913 for edge area B is greater than a noise envelope 914, which shows the effects of a noise filter. However, noise in the transition area is much less objectionable than in the flat areas.

Figure 20A:
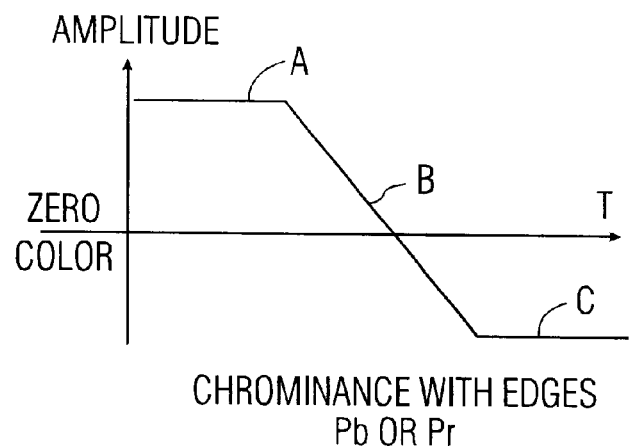
FIG. 20A shows the change in a $P_b$ or $P_r$ chrominance signal with time.
Figure 20B:
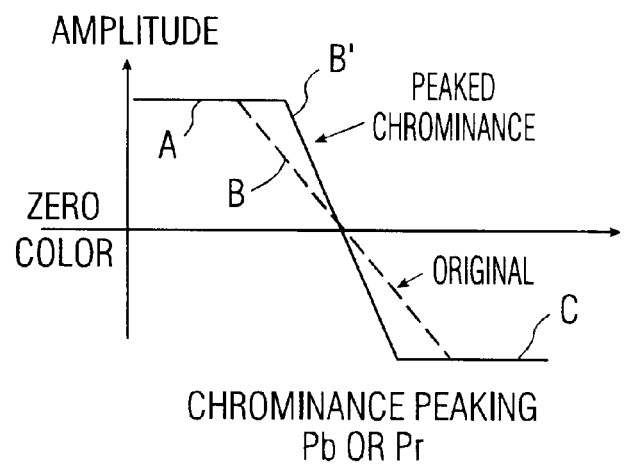
FIG. 20B shows the effects of adaptive peaking in accordance with the invention on the signal of FIG. 20A.

FIG. 20A shows the $P_b$ or $P_r$ chrominance plot for a signal having flat areas A and C and a transition region B, similar to that of FIG. 18A. FIG. 20B shows how edge region B can be sharpened, to B', based on the DCT coefficients representing the high frequency components of FIG. 18B. As discussed earlier, because peaking is only performed in area B, there will be no increase in noise in areas A and C, where noise can be more objectionable.

ing elements, a peaking system and a display. If the television is constructed to receive an MPEG compressed digital video signal, the transmission elements send the DCT information to the adaptive peaking elements and feeds the signal to the peaking system. The adaptive peaking elements control the peaking system and determine which portion of the signal will be subjected to peaking. The signal is then displayed. If the television is not constructed to receive such a signal, the source signal processing elements can include A/D and/or D/A converters and elements for obtaining the DCT coefficients for use by the adaptive peaking elements.

The processor implementing the algorithm that analyzes the DCT coefficients can be programmed to make either a "peaking decision" on a block-by-block basis or the decision

TABLE 1

| Signal Type | | | Signal Level | Processing | | | | Noise Reduction |
|---|---|---|---|---|---|---|---|---|
| Y | Pb | Pr | | Peaking on Y | Peaking on Chroma | Stretch | CTI | |
| Edges | Edges | Edges | High or Low | On | On | Off | On | Off |
| Edges | Noise | Noise | High or Low | On | Off | Off | Off | On |
| Edges | Edges with noise | Edges | High | On | On | On, reduce contrast | On for red | On |
| Edges | Edges with noise | Edges | Low | On | On | Off | On for red | Off |
| Edges | Edges | Edges with noise | High | On | On | On, increase contrast | On for blue | On |
| Edges | Edges | Edges with Noise | Low | On | On | On, increase contrast | On for blue | Off |

Table 1 summarizes signal processing techniques that can be employed in accordance with the invention. As shown, the luminance (Y) signal and chroma signal (P) is peaked in areas of edges. Noise reduction is also advantageously employed with respect to the high level chroma signal where noise is present. Stretch is advantageous when edges are detected and noise is present, but contrast might need to be adjusted. Color transmissive improvement (CTI) can be desirable when edges are detected and noise is not present. In another embodiment of the invention, only the Y signal will be peaked when edges are detected on the $P_b$ or $P_r$ signals. In still another embodiment of the invention, selective peaking will be restricted to the Y signal if noise is detected in the $P_b$ or $P_r$ signals.

As seen from the foregoing, an adaptive peaking method in accordance with the invention can provide benefits to the display of a transmitted video signal. YUV to RGB color matrixing is not needed to analyze the chrome signal. DCT analyzer and peaking control processor 180 of FIG. 1 can be in the form of a signal processor which can include one or more inputs for receiving signals, a signal processing unit and an output for outputting a signal. The signal processing unit can be constructed as hardware, firmware or can be controlled with software. The signal processor for performing adaptive peaking in accordance with the invention can be an add-on to a video processing chain before the video signal is displayed. The video can be either analog or digital (MPEG or non-MPEG); however, the peripheral hardware required to add-on this improved method is reduced when the video is in the MPEG format, because the DCT coefficients are readily available.

A television constructed in accordance with the invention includes source signal processing elements, adaptive peak- (based on some type of threshold or spectrum profile/histogram analysis) can be "filtered" or "averaged" over some predetermined number of blocks, to "smooth out" the change of filter and coefficients. Thus, the "history" of the image, either spatially or temporally, can be taken into account when deciding to apply peaking. By performing selected peaking at the signal receiver, the delivered signal can have been transmitted in accordance with ATSC standards.

It will thus be seen that the objects set forth above, among those made apparent from the preceding description, are efficiently attained and, since certain changes may be made in the above methods and constructions without departing from the spirit and scope of the invention, it is intended that all matter contained in the above description or shown in the accompanying drawings be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method for peaking a video signal, comprising:
   receiving a source video signal including luminance and chrominance portions and including a chroma-difference signal segment which has been delivered as a compressed stream of data which includes the DCT coefficients for the decompressed video signal;
   obtaining the spectral histogram of chrominance energy or the chrominance DCT coefficients for a selected portion of the video signal from the source video signal and comparing the spectral histogram or the amplitude of the DCT coefficients to a predetermined spectral profile or level; and peaking the luminance and/or chrominance portion of the selected portion of the video signal based on the comparison of the spectral histogram to the profile or when the amplitude of the DCT coefficients of the selected portion of the video signal meet or exceed the predetermined threshold level.

2. The method of claim 1, wherein the selected portion of the video signal is peaked when the chrominance DCT coefficients of the chroma-difference signal meet or exceed a threshold.

3. The method of claim 1, wherein the spectral histogram of chrominance energy is obtained for each I-frame and peaking is selectively based on the histogram.

4. The method of claim 1, wherein the chrominance I-frame DCT coefficients are compared to the threshold and peaking is based on this comparison.

5. The method of claim 1, wherein the source video signal includes signal segments representing I-frames and peaking is applied in the luminance path when the spectral histogram or the DCT coefficients indicate that the chrominance energy of certain parts of the chrominance spectral histogram in the I-frame exceeds a threshold value.

6. The method of claim 1, where peaking is applied to segments of the signal representing boundaries between portions of the display having color differences and less or no peaking is applied to segments of the signal representing sufficiently flat color regions.

7. The method of claim 1, wherein the source video signal includes signal segments representing I-frames and peaking is applied at the I-frame rate.

8. The method of claim 1, wherein peaking is applied in both the horizontal and vertical directions.

9. The method of claim 1, wherein the DCT coefficients of a signal which have been processed are obtained and compared to the threshold or spectral profile/histogram.

10. The method of claim 1, wherein the step of peaking employs a high pass filter set to a predetermined frequency and boosting portions of the selected portions of the video signal having a frequency above the predetermined frequency.

11. The method of claim 1, wherein the step of peaking involves subjecting the signal to a band pass filter having a pre-determined frequency band and boosting portions of the selected portion of the video signal falling within a predetermined frequency band.

12. The method of claim 2, wherein the degree of peaking is proportional to the extent the amplitude of the DCT coefficients exceeds the predetermined threshold level.

13. The method of claim 1, wherein the predetermined threshold level or spectral profile is set to determine whether the selected portion of the video signal corresponds to a selected level of display color detail, and peaking is applied to selectively detailed portions of a video signal and not to relatively flat colored portions of the signal.

14. The method of claim 1, wherein peaking is performed on the luminance portion of the signal only.

15. A signal processor, responsive to DCT coefficients from a video signal including luminance and chrominance portions, for selectively peaking a video signal, comprising:

an input portion, an output portion and a processing unit coupled between the input and output portions, the processing unit constructed and adapted to receive chrominance DCT coefficients for a block of video data corresponding to a selected portion of a video signal; determine the amplitudes of the DCT coefficients; compare the amplitudes of the DCT coefficients to a predetermined threshold level or spectrum profile/histogram and output a signal indicating that peaking of the luminance and/or chrominance portions of the signal should occur for the selected portion of the video signal when the DCT coefficients of the selected portion of the video signal meet or exceed the predetermined threshold level or matches the spectrum profile/histogram.

16. The signal processor of claim 15, wherein the processing unit is constructed to process a signal including segments corresponding to I-frames, which are to be displayed at an I-frame rate and the processor is constructed to apply peaking at the I-frame rate.

17. The signal processor of claim 15, wherein peaking is only performed on the luminance portion of the signal.

18. A television, comprising:

a housing having a signal input, a source signal processor, a peaking signal processor, a peaking filter system, and a video display mounted thereon;

the source signal processor coupled to the signal input and to the peaking signal processor and the peaking system, the source signal processor constructed to receive a signal from the signal input and transmit chrominance DCT coefficients corresponding to a video signal to the peaking signal processor and to transmit a video signal to the peaking system;

the peaking signal processor coupled to the source signal processor at an input and to the peaking system at an output, the peaking signal processor constructed to receive a signal from the source signal processor and to obtain the chrominance DCT coefficients corresponding to selected portions of the video signal, compare the amplitude of the chrominance DCT coefficients to a predetermined threshold level or spectrum profile/histogram and when the amplitude meets or exceeds the threshold or matches the spectrum profile histogram, output a control signal to the peaking system to cause the peaking system to perform a peaking operation;

the peaking system is constructed to receive a video signal from the source signal processor and a control signal from the peaking signal processor and to peak the video signal in accordance with instructions contained in the control signal from the peaking signal processor and to transmit the selectively peaked video signal to the display;

the display constructed to receive a selectively peaked video signal from the peaking system and display the video signal.

19. The television of claim 18, wherein the source signal processor is constructed to receive a coded compressed digital video signal and decode and decompress the signal.

20. The television of claim 18, wherein the peaking system includes a polyphase re-sampling type filter constructed to receive multiple filter taps.

21. The television of claim 18, wherein the source signal processor comprises an analog to digital converter and is constructed to develop DCT coefficients for a signal converted by said converter and supply said DCT coefficients to the peaking signal processor.

22. A method for peaking a video signal, comprising:

receiving a video signal;

obtaining the chrominance DCT coefficients corresponding to selected portions of the signal;

comparing the amplitude of the DCT coefficients to a predetermined threshold level or spectral profile/histogram; and peaking the selected portion of the video signal when the DCT coefficients of the video signal meet or exceed the predetermined threshold level or match the spectral profile/histogram.

23. The method of claim 22, wherein the received video signal is an analog signal and the signal is, in parallel, converted to a digital signal, and the DCT coefficients are obtained for a selected portion of the digital signal corresponding to the selected portion of the analog signal.

24. The method of claim 22, wherein peaking is performed with a digital filter, the analog signal is converted to a digital signal prior to peaking and is converted to an analog signal after peaking is performed.

25. The method of claim 22, wherein peaking is performed in both the horizontal and vertical directions.

* * * * *